US008235366B2

(12) United States Patent
Anton

(10) Patent No.: US 8,235,366 B2
(45) Date of Patent: Aug. 7, 2012

(54) SPRING SYSTEM

(75) Inventor: Gaile Anton, Leutkirch (DE)

(73) Assignee: Liebherr Aerospace Lindenberg GmbH, Lindenberg/Allgau (DE)

( * ) Notice: Subject to any disclaimer, the term of this patent is extended or adjusted under 35 U.S.C. 154(b) by 110 days.

(21) Appl. No.: 11/474,120

(22) Filed: Jun. 22, 2006

(65) Prior Publication Data
US 2007/0035103 A1 Feb. 15, 2007

(30) Foreign Application Priority Data

Jun. 23, 2005 (DE) .................. 20 2005 009 909 U

(51) Int. Cl.
B60G 13/00 (2006.01)
B60G 9/00 (2006.01)

(52) U.S. Cl. ...... 267/218; 267/34; 267/221; 267/DIG. 1

(58) Field of Classification Search .................. 267/217, 267/218, 220, 221, 34, DIG. 1, DIG. 2, 186; 280/124.162; 105/182.1, 199.1; 188/322.2, 188/322.21
See application file for complete search history.

(56) References Cited

U.S. PATENT DOCUMENTS

| 1,214,120 | A | * | 1/1917 | Bayne | 267/29 |
| 2,159,457 | A | * | 5/1939 | Sproul | 213/32 R |
| 3,273,876 | A | * | 9/1966 | Hannan | 267/186 |
| 3,606,294 | A | * | 9/1971 | Pollinger | 137/38 |
| 3,991,863 | A | * | 11/1976 | Lee | 188/289 |
| 4,973,077 | A | * | 11/1990 | Kuwayama et al. | 280/124.107 |
| 5,401,053 | A | * | 3/1995 | Sahm et al. | 280/5.502 |
| 5,533,481 | A | * | 7/1996 | Kronberger | 123/299 |
| 5,687,783 | A | * | 11/1997 | Finnegan | 141/364 |
| 6,039,388 | A | * | 3/2000 | Choi | 296/207 |
| 6,676,119 | B2 | * | 1/2004 | Becker et al. | 267/218 |
| 2005/0029064 | A1 | * | 2/2005 | Gaile | 188/322.21 |
| 2008/0054537 | A1 | * | 3/2008 | Harrison | 267/64.16 |

FOREIGN PATENT DOCUMENTS

| GB | 2406584 A | * | 4/2005 |
| JP | 02099416 A | * | 4/1990 |

* cited by examiner

Primary Examiner — Melody Burch
(74) Attorney, Agent, or Firm — Alleman Hall McCoy Russell & Tuttle LLP

(57) ABSTRACT

The present disclosure relates to a spring system comprising a strut for arrangement between a dolly and a body of a rail vehicle with a cylinder and a piston displaceably received in the cylinder which bound a piston chamber, with the piston or the cylinder being connectable to the dolly and the other of the components being connectable to the body and with one or more spring which cushion the body with respect to the dolly, with a non-resilient hydraulic system which is in communication with the piston chamber and by means of which the amount of the hydraulic medium in the piston chamber can be varied for the purpose of adjusting the strut length, with an abutment member being provided by means of which the end position of the piston can be changed in the cylinder and with means being provided which are made such that the means actuates the abutment member when the piston chamber of the hydraulic system is pressure-less or the pressure in the piston chamber or in the hydraulic system falls below a value.

16 Claims, 3 Drawing Sheets

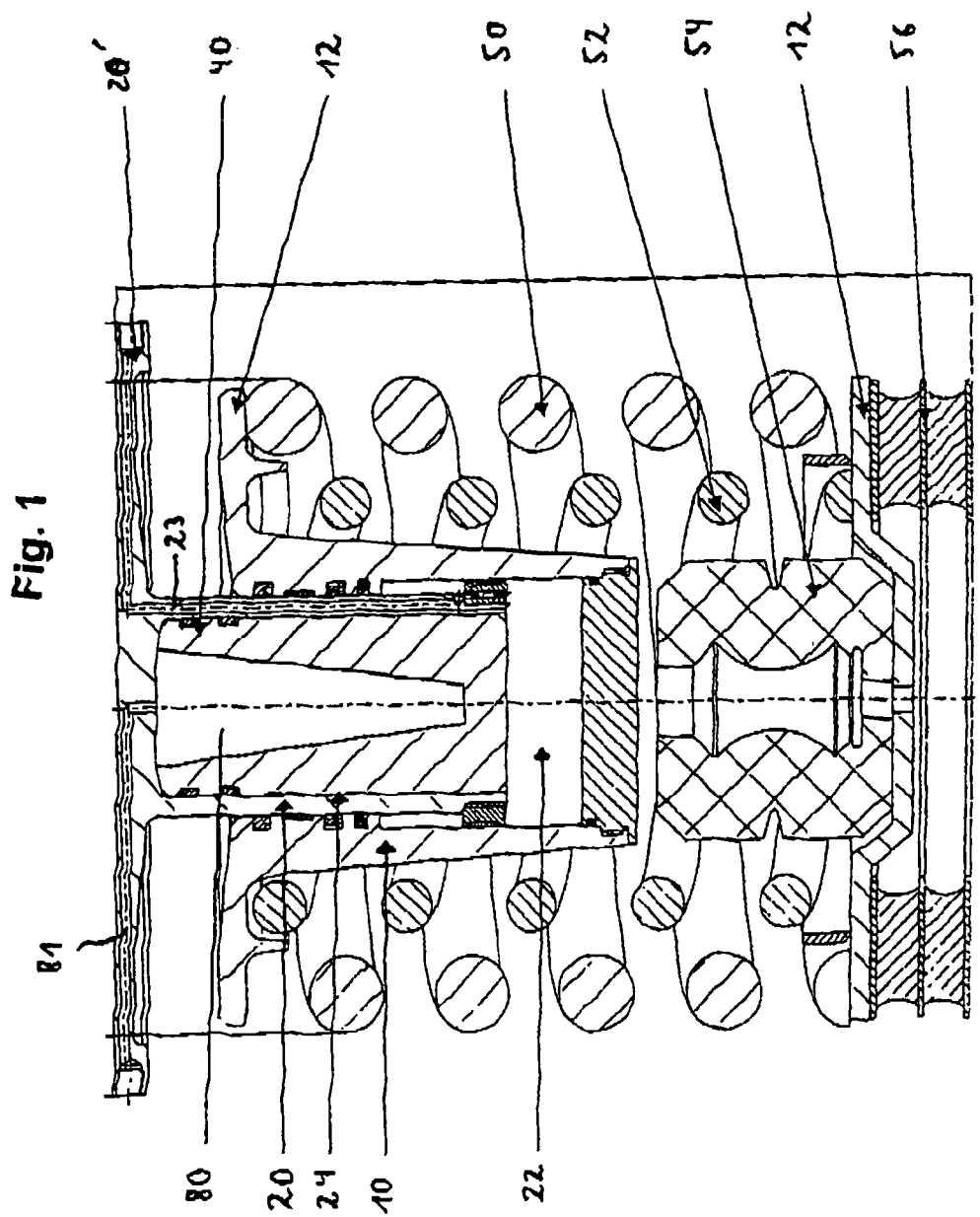

SPRING SYSTEM

CROSS-REFERENCE TO RELATED APPLICATION

This application claims priority to German Utility Model Application Serial No. 20 2005 009 909.0 filed Jun. 23, 2005, which is hereby incorporated by reference in its entirety for all purposes.

FIELD

The present disclosure relates to a spring system comprising a strut for arrangement between the dolly and body of a rail vehicle with a cylinder and a piston displaceably received in the cylinder which bound a piston chamber, wherein the piston or the cylinder can be connected to the dolly and the other of the components can be connected to the body.

BACKGROUND AND SUMMARY

So-called hydropneumatic struts are known from the prior art which have a cylinder and a piston longitudinally displaceably received in the cylinder and whose piston chamber is in communication with a hydraulic accumulator. The hydraulic accumulator is generally a hydraulic accumulator containing hydraulic fluid and moreover containing a compressible gas volume. On a movement of the rail vehicle, hydraulic fluid is guided out of the piston chamber into the hydraulic accumulator or out of the hydraulic accumulator into the piston chamber, with the said compressible gas volume having resilient properties so that the hydropneumatic strut acts as a spring element. In this connection, each hydropneumatic strut is typically connected to its own hydraulic accumulator, whereby a comparatively complex design results.

It is the object of the present disclosure to provide a spring system of the first named type which has a simpler structure.

This object may be solved by a spring system having a strut for arrangement between a dolly and a body of a rail vehicle, the strut having a cylinder and a piston displaceably received in the cylinder which bound a piston chamber, with the piston or the cylinder being connectable to the dolly and the other of the components being connectable to the body and with one or more springs which cushion the body with respect to the dolly. Further, a non-resilient hydraulic system is provided which is in communication with the piston chamber and by means of which the amount of the hydraulic medium in the piston chamber can be varied for the purpose of adjusting the strut length. Furthermore, an abutment member is provided by means of which the end position of the piston in the cylinder can be changed, with means being provided which are designed such that they actuate the abutment member when the piston chamber or the hydraulic system is pressure-less or when the pressure in the piston chamber or in the hydraulic system falls below a value.

The hydraulic system in communication with the piston chamber does not have any resilient properties. The first named hydraulic accumulators known from the prior art may not be provided. It rather serves the adjustment of the strut length and thus the variation of the vehicle height between different operating states such as between the traveling operation and the standing of the rail vehicle at the station.

The suspension of the rail vehicle is thus not ensured by the piston-in-cylinder unit or by the hydraulic system in communication with it, but is ensured by one or more springs which cushion the body with respect to the dolly.

If it is found that the pressure in the hydraulic system or in the piston chamber drops below a limit value or if the system becomes pressure-less, the abutment member is actuated, which has the result that the end position of the piston in the cylinder is changed. In emergency operation, the actuated abutment member has the result that the piston can no longer be moved so far into the cylinder as is the case with a non-actuated abutment. A minimum vehicle height is ensured in this manner.

The abutment member can be made displaceable in the direction of movement of the piston or in a direction extending obliquely or perpendicular thereto. It is possible that the piston has a hollow space at least sectionally and that the abutment member is made displaceable relative to the hollow space of the piston. Provision can be made in this connection for the abutment member to be made such that it can be displaced between a moved-in and a pushed-out state, with it being located completely in the hollow space of the piston in the moved-in state. In this state, the abutment member thus has no influence on the piston position.

Provision is made in a further aspect of the present disclosure for the abutment member, the cylinder and the piston to be arranged concentrically to one another.

Provision is made in a further aspect of the present disclosure for the cylinder to have a section of larger diameter and a section of a diameter smaller with respect to it, with the piston being guided in both sections. It is possible that the cylinder and/or the piston has/have one or more seals which prevent a discharge of hydraulic medium from the piston chamber. The guidance of the piston in the section of the cylinder having a larger diameter can be achieved by a peripheral ring located in the end region of the piston, having bores for the passage of the hydraulic medium and furthermore serving as an abutment for the piston movement.

In a further aspect of the present disclosure, a hydraulic accumulator is provided which can be connected to a space which is arranged in the abutment member and/or is adjacent to the abutment member. The means for the actuation of the abutment member has the result that the medium flows out of the hydraulic accumulator into the said space, which in turn has the result that the abutment member is pushed out. Provision is made in a preferred aspect for this space to be adjacent to the abutment member in its end region remote from the piston chamber.

In a further aspect of the present disclosure, a check valve is provided which is arranged such that it permits a flow from the hydraulic accumulator into the space and suppresses a flow from the space into the hydraulic accumulator. It is ensured in this manner that in emergency operation, that is when the piston chamber or the hydraulic system is pressure-less or the pressure in the piston chamber or in the hydraulic system falls below a predetermined value, the abutment member remains in the actuated state in which the piston can no longer be moved fully into the cylinder, but remains in a moved-out position and thus ensures that the spacing between the body and the dolly, and thus the vehicle height, maintains a specific minimum value.

Provision is made in a further aspect for the means actuating the abutment member to comprise pressure-controlled valves. These valves are made such that they establish or cancel a connection between the said hydraulic accumulator and the space which is adjacent to the abutment member or extends in the abutment member.

Provision can furthermore be made for the means actuating the abutment member to be electrical. An embodiment is possible in which pressure sensors are arranged which sense the pressure and control valves accordingly directly or indirectly by means of a control unit such that a connection is established between the hydraulic accumulator and the space.

Provision is made in a further aspect of the present disclosure that the one or more springs are connected in series to the cylinder with the piston that is to the unit of cylinder and piston.

The springs can be one or more coil springs. It is possible that a plurality of springs are provided which are arranged concentrically to one another and/or to the piston-in-cylinder unit.

In a preferred aspect of the present disclosure, the springs extend between the cylinder and the body or between the cylinder and the dolly.

Provision is made in a further aspect of the present disclosure for the springs to be one or more coil springs extending between spring plates and for at least one further spring to be located in series with one of the spring plates and/or in the region between the cylinder and one of the spring plates. The spring located in series with one of the said spring plates can, for example, be a multilayer spring, for example a rubber spring. The spring extending between the cylinder and one of the spring plates can, for example, be a spring having a hollow space which is elastically deformed as required.

BRIEF DESCRIPTION OF THE FIGURES

Further details and advantages of the present disclosure result from an embodiment shown in the drawings. There are shown:

FIG. 1 shows a sectional representation through the strut in accordance with the present disclosure in normal operation;

DETAILED DESCRIPTION

Figure 3:
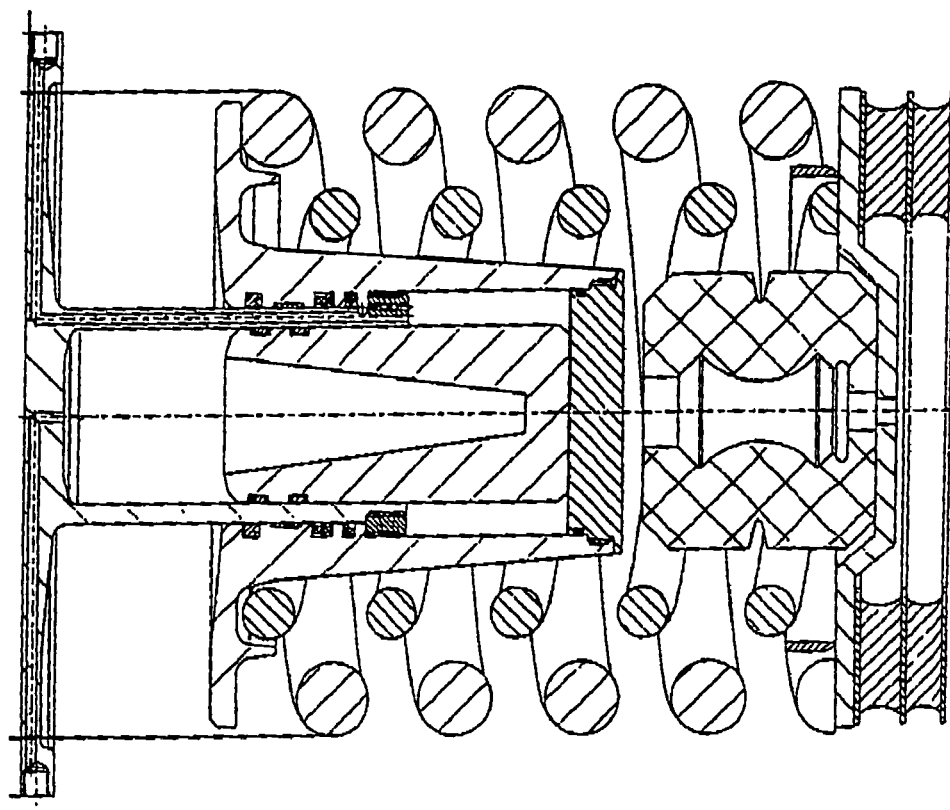
FIG. 3 shows a sectional representation through the strut in accordance with the present disclosure in emergency operation with a moved-out abutment member.

FIG. 1 shows the strut of the present disclosure in a longitudinal sectional representation which is arranged between the dolly and the body of a rail vehicle. The strut has a cylinder 10 and a piston 20 displaceably received in the cylinder 10. The cylinder 10 and the piston 20 bound the piston chamber 22 which is filled with a suitable hydraulic medium. The supply and the removal of hydraulic medium from the piston chamber 22 takes place by means of the line 23 which extends through the piston 22, as can be seen from FIG. 1. The piston 20 has a substantially cylindrical section and a plate-shaped section 20' forming its upper boundary.

The cylinder 10 has an upwardly arranged section of smaller internal diameter and a section of larger internal diameter arranged further below. Seals which seal which piston chamber 22 are located in the section of smaller diameter in the peripheral direction on the inner side of the cylinder 10. The piston 20 contacts the section of the cylinder having a larger internal diameter by means of a ring arranged in the lower end region of the piston 20. The ring serves, on the one hand, for the guidance of the piston 20 in this region and, on the other hand, forms an upper abutment for the piston 20. The ring has a bore which has the effect that the hydraulic medium in the piston chamber 22 can flow from the region above the ring into the region below the ring and in the reverse direction.

The cylinder 10 has a spring plate 12 in its upper end region. Two coil springs 50, 52 extend between the spring plate 12 and a further spring plate 12, are arranged concentrically to one another and both support the cylinder 10 with respect to the spring plate 12 shown at the bottom.

While the upper spring plate 12 is an integral component of the cylinder 10, the lower spring plate 12 is formed by a separate component.

The further spring 54, which is made as a hollow spring, is located in the region between the lower spring plate 12 and the cylinder 10. The rubber spring 56 consisting of a plurality of layers is located below the lower spring plate 12, as can be seen from FIG. 1.

The piston 20 has a hollow space 24 in which the abutment member 40 is longitudinally displaceably arranged. The abutment member 40 is movable in the hollow space 24 of the piston 20 in the same direction as the piston 20 is movable in the cylinder 10.

In the normal operation shown in FIG. 1, the abutment member 40 is completely retracted into the hollow space 24 of the piston 20 so that it does not project beyond the lower surface of the piston 20 facing the piston chamber 22.

As can further be seen from FIG. 1, a space 80 is located in the abutment member 40 which is in communication with a line 81 by which the space 80 is fed with a suitable medium, preferably with the same hydraulic medium as the piston chamber 22.

Figure 4:
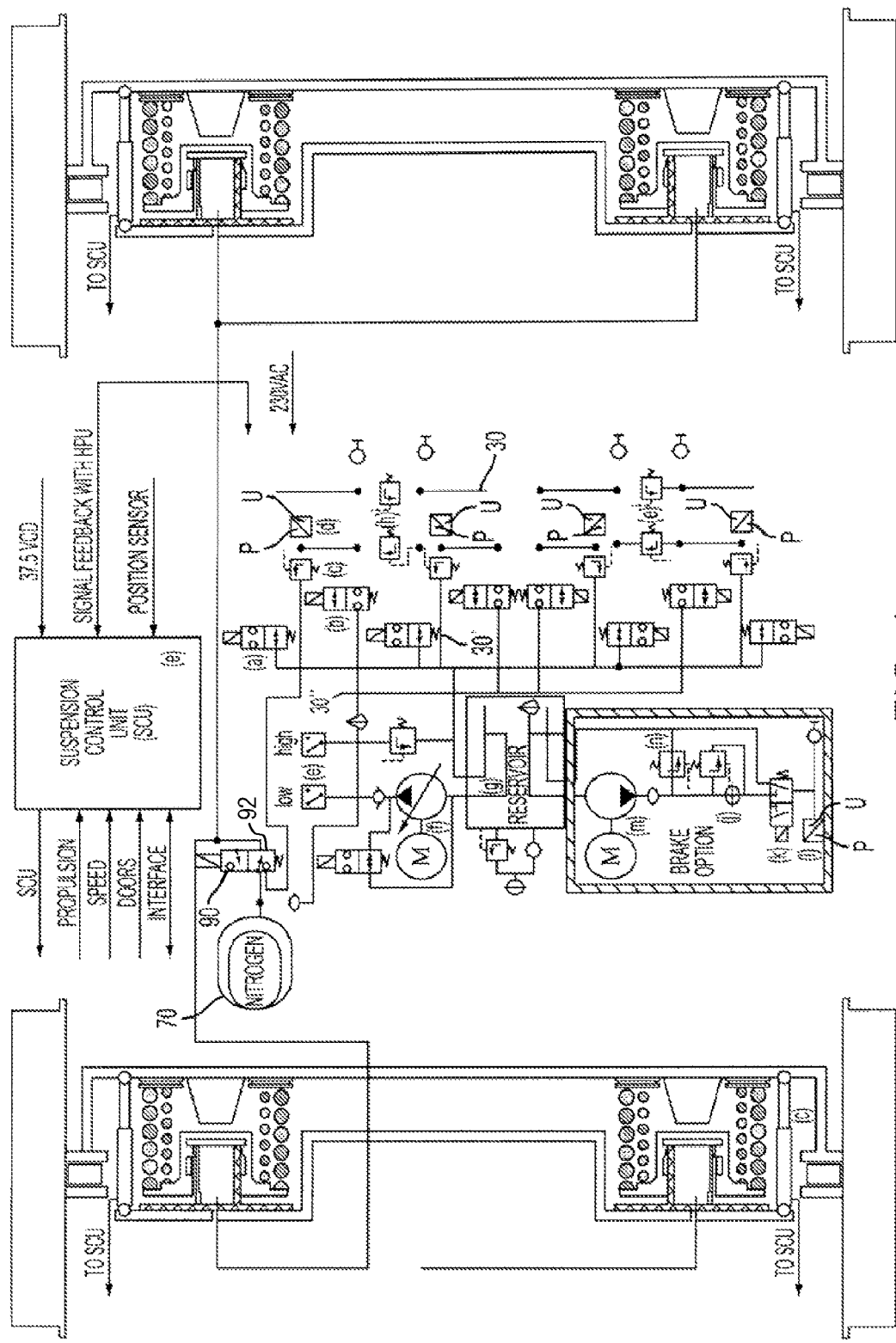
FIG. 4 shows a schematic representation of a hydraulic circuit in communication with the struts in accordance with the present disclosure.

The spacing between the piston 20 and the cylinder 10, and thus the car height, can be changed by changing the volume of the hydraulic medium located in the piston chamber 22. The hydraulic system 30 visible from FIG. 4 serves this purpose. It is hydraulically connected to all four struts which cushion the body with respect to the dolly. The hydraulic system is designated with reference numeral 30 and is in each case in communication with the piston chambers 22 of the struts. If the car height should be reduced, the valves visible from FIG. 4 are switched such that the hydraulic system 30 is connected to a low-pressure system 30' which has the result that hydraulic medium is drawn out of the piston chambers 22 and the vehicle height is reduced. The necessity to reduce the car height can be present, for example, when the rail vehicle is standing at a station so that passengers can get on and off easily.

If the car height should be increased, the hydraulic system 30 is connected to the high-pressure system 30", which is achieved by a corresponding connection of the valves shown in FIG. 4. In this case, hydraulic medium flows from the system 30" into the hydraulic system 30 and via this into the piston chamber 22 until the desired vehicle height has been reached which is desired, for example, for travel operation. The high-pressure hydraulic system 30" is fed by a variable delivery pump which is in communication with the low-pressure hydraulic system 30' on the suction side, as can be seen from FIG. 4.

The hydraulic system 30 in accordance with FIG. 4 is made non-resiliently. In the particular embodiment shown in the figures, it has no hydraulic accumulators known from previously known systems which take over suspension during travel operation. Provision is made in moving operation, for example, for the volume of the hydraulic medium in the piston chambers 22 to remain constant so that the hydraulic system 30, 30' and 30" is not flowed through during travel operation but is static if no change is made to the vehicle height. A throughflow of the hydraulic system in the one direction or the other preferably only takes place when the vehicle height should be reduced after driving into a station or when the vehicle height should be increased again after the passengers have got on or off. A vehicle height adjustment is naturally also possible during travel operation.

Figure 2:
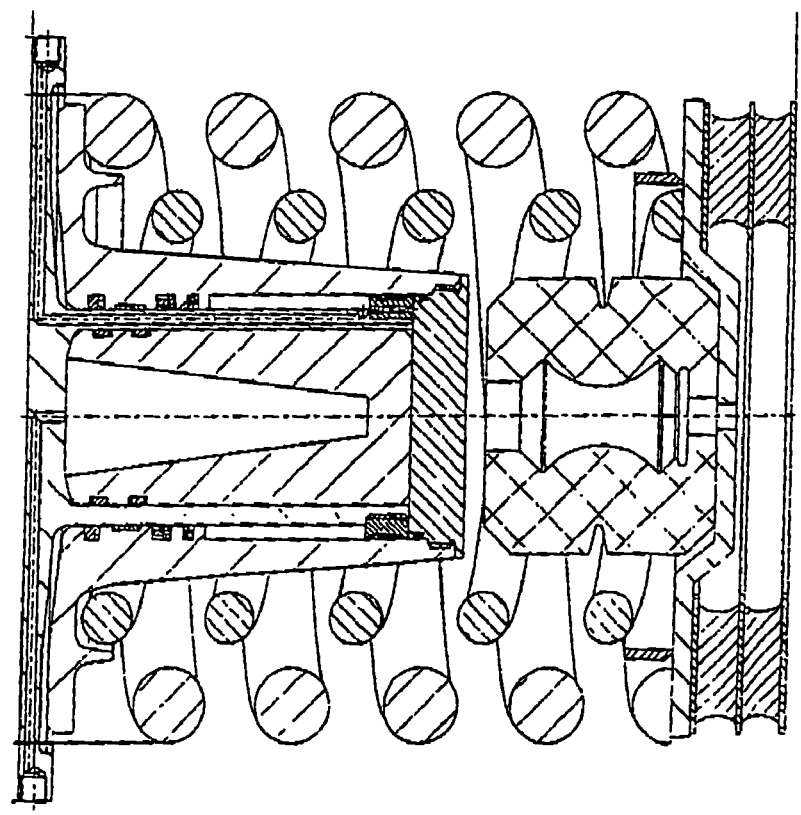
FIG. 2 shows a sectional representation through the strut in accordance with the present disclosure in the pressure-less state.

If a pressure drop occurs in the hydraulic system 30, this can have the result that the piston 20 lies on the base plate of the cylinder 10. This state is shown in FIG. 2. A state of this type results in a very low vehicle height which can be critical for safety and can, in such a case, even have the result that the rail vehicle is derailed.

In order also to ensure an adequate minimum height of the vehicle in case of an emergency, an emergency system is provided which will initially be explained in accordance with FIG. 4. The emergency system has a hydraulic accumulator 70 which is fed from the high-pressure hydraulic system 30". This means that the same pressure is present in the hydraulic accumulator 70 as in the high-pressure hydraulic system 30". In normal operation of the vehicle, the valve 90 located in the outlet line of the hydraulic accumulator 70 is connected such that the hydraulic accumulator 70 is closed, that is that the hydraulic medium located in it cannot flow out. If a pressure drop occurs in one of the systems 30, 30' or 30", this has the result that the hydraulic accumulator 70 is connected to the space 80 by means of the valve 90 then connected in accordance with FIG. 1. This has the result that the hydraulic medium standing under high pressure flows out of the hydraulic accumulator 70 into the space 80 and pushes out the abutment member 40 relative to the piston 20, as is shown in FIG. 3. In this state, the end face of the abutment member 40 facing the piston chamber 22 lies on the base plate of the cylinder 10, as is shown in FIG. 3. The hydraulic medium which stands under high pressure, ensures that the vehicle height does not fall below the level shown in FIG. 3 and has flown out of the hydraulic accumulator 70 is located in the space 80 which is composed, on the one hand, of the hollow space of the abutment member 40 and of the space located above the abutment member 40, as is shown in FIG. 3. To prevent hydraulic medium from flowing out of the space 80 back into the hydraulic accumulator 70, a check valve 92 can be provided at a suitable site which admittedly permits the filling of the space 80 from the hydraulic accumulator 70, but prevents the flow in the reverse direction.

In addition to or instead of the pressure-controlled valve 90 shown in FIG. 4, electrical valves can also be provided which are actuated correspondingly to the extent that pressure sensors arranged at a suitable site determine a pressure drop or the pressure-less state.

The invention claimed is:

1. A spring system comprising
   (i) a strut for arrangement between a dolly and a body of a rail vehicle, the strut comprising
      a non-resilient piston-in-cylinder unit with a cylinder and a piston displaceably received in the cylinder which bound a piston chamber, an abutment member, and a space arranged adjacent an end region of the abutment member remote from the piston chamber so that the space is fluidly separated from the piston chamber, wherein the piston or the cylinder is connectable to the dolly and the other of the components is connectable to the body and
      one or more resilient springs which cushion the body with respect to the dolly and which are connected in series to the non-resilient piston-in-cylinder unit,
   (ii) a hydraulic system which is in communication with the piston chamber, for varying an amount of a hydraulic medium in the piston chamber for adjusting a length of the strut, wherein the hydraulic system is non-resilient such that suspension of the rail vehicle is not ensured by the piston-in-cylinder unit and also is not ensured by the hydraulic system in communication with it, and
   (iii) a hydraulic accumulator connected to the space for hydraulically actuating the abutment member such that a hydraulic medium flows from the hydraulic accumulator into said space to change an end position of the piston in the cylinder in response to the piston chamber or the hydraulic system becoming pressure-less or a pressure in the piston chamber or in the hydraulic system falling below a value.

2. The spring system according to claim 1, wherein a height of the body of the rail vehicle is increased to an adequate minimum ride height by the change of end position of the piston in the cylinder.

3. The spring system according to claim 1, wherein the piston has a hollow space at least sectionally, and wherein the abutment member is actuatable relative to the hollow space of the piston.

4. The spring system according to claim 3, wherein the abutment member can be actuated between a moved-in and a pushed-out state, with it being located completely in the hollow space of the piston in the moved-in state.

5. The spring system according to claim 1, wherein the cylinder, the piston and the abutment member are arranged concentrically.

6. The spring system according to claim 1, wherein the cylinder has a section of larger diameter and a section of a diameter smaller with respect to it, with the piston being guided in both sections.

7. The spring system according to claim 1, further comprising a check valve arranged such that it permits a flow out of the hydraulic accumulator into the space and suppresses a flow out of the space into the hydraulic accumulator.

8. The spring system according to claim 7, wherein the check valve comprises a pressure-controlled valve.

9. The spring system according to claim 7, wherein the check valve comprises an electrically-controlled valve.

10. The spring system according to claim 1, wherein the one or more springs are formed by coil springs.

11. The spring system according to claim 1, wherein the plurality of springs are provided concentrically to one another and/or concentrically to the cylinder.

12. The spring system according to claim 11, wherein the plurality of springs extend between the cylinder and the body or the dolly.

13. The spring system according to claim 11, wherein the plurality of springs are made as one or more coil springs extending between spring plates and wherein at least one further spring is located in series with one of the spring plates and/or in a region between the cylinder and one of the spring plates.

14. A method for controlling ride height of a rail vehicle, the vehicle having a spring system having a strut for arrangement between a dolly and a body of the rail vehicle comprising
   a non-resilient piston-in-cylinder unit with a cylinder and a piston displaceably received in the cylinder which bound a piston chamber, an abutment member and a space arranged adjacent an end region of the abutment member remote from the piston chamber so that the space is fluidly separated from the piston chamber, wherein the piston or the cylinder is connectable to the dolly and the other of the components is connectable to the body and one or more resilient springs which cushion the body with respect to the dolly and which are connected in series to the non-resilient piston-in-cylinder unit, the method comprising:

(i) adjusting an amount of a hydraulic medium in the piston chamber to adjust a length of the strut via a hydraulic system in response to a vehicle operating parameter; wherein the hydraulic system is non-resilient such that suspension of the rail vehicle is not ensured by the piston-in-cylinder unit and also is not ensured by the hydraulic system in communication with it, and (ii) in response to the piston chamber or the hydraulic system becoming pressure-less or a pressure in the piston chamber or in the hydraulic system falling below a value, changing an end position of the piston in the cylinder with the abutment member by adjusting an amount of a hydraulic medium in the space to increase the ride height of the rail vehicle to an adequate minimum ride height.

15. The method of claim 14, wherein said adjusting includes lowering the ride height of the vehicle when the vehicle is stopped, and raising the ride height of the vehicle when the vehicle is moving.

16. A spring system comprising (i) a strut for arrangement between a dolly and a body of a rail vehicle, the strut comprising a non-resilient piston-in-cylinder unit with a cylinder and a piston displaceably received in the cylinder which bound a piston chamber, an abutment member, and a space arranged adjacent an end region of the abutment member remote from the piston chamber so that the space is fluidly separated from the piston chamber, wherein the piston or the cylinder is connectable to the dolly and the other of the components is connectable to the body and one or more resilient springs which cushion the body with respect to the dolly and which are connected in series to the non-resilient piston-in-cylinder unit, (ii) a hydraulic system which is in communication with the piston chamber, for varying an amount of a hydraulic medium in the piston chamber for adjusting a length of the strut, wherein the hydraulic system is non-resilient such that suspension of the rail vehicle is not ensured by the piston-in-cylinder unit and also is not ensured by the hydraulic system in communication with it, (iii) a hydraulic accumulator to supply high pressure hydraulic fluid to the space to change an end position of the piston in the cylinder to increase a height of the body of the rail vehicle to an adequate minimum ride height in response to the piston chamber of the hydraulic system being pressure-less or a pressure in the piston chamber or in the hydraulic system falling below a value, and (iv) a check valve arranged to permit a flow out of the hydraulic fluid from the hydraulic accumulator into the space and to suppress a flow out of the hydraulic fluid from the space into the hydraulic accumulator.

* * * * *